US010964441B2

(12) United States Patent
Lindsay et al.

(10) Patent No.: US 10,964,441 B2
(45) Date of Patent: Mar. 30, 2021

(54) CONDUCTIVE PARTICLES, ARTICLES, AND METHODS

(71) Applicant: 3M INNOVATIVE PROPERTIES COMPANY, St. Paul, MN (US)

(72) Inventors: Craig W. Lindsay, Minneapolis, MN (US); Kenton D. Budd, Woodbury, MN (US); Dipankar Ghosh, Oakdale, MN (US); Noah O. Shanti, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 83 days.

(21) Appl. No.: 16/472,148

(22) PCT Filed: Dec. 19, 2017

(86) PCT No.: PCT/US2017/067247
§ 371 (c)(1),
(2) Date: Jun. 20, 2019

(87) PCT Pub. No.: WO2018/118880
PCT Pub. Date: Jun. 28, 2018

(65) Prior Publication Data
US 2019/0326031 A1    Oct. 24, 2019

Related U.S. Application Data

(60) Provisional application No. 62/437,236, filed on Dec. 21, 2016.

(51) Int. Cl.
*H01B 1/22* (2006.01)
*C08K 3/34* (2006.01)
(Continued)

(52) U.S. Cl.
CPC ............... *H01B 1/22* (2013.01); *C08K 3/34* (2013.01); *C08K 3/40* (2013.01); *C08K 7/28* (2013.01);
(Continued)

(58) Field of Classification Search
CPC .... H01B 1/22; C08K 3/34; C08K 3/40; C08K 7/28; C08K 2201/001; C08K 2003/0806;
(Continued)

(56) References Cited

U.S. PATENT DOCUMENTS 4,125,665 A    11/1978 Bemmels
4,152,231 A    5/1979 St. Clair
(Continued)

FOREIGN PATENT DOCUMENTS

JP    3083535           9/2000
JP    3083535 B2 *      9/2000
(Continued)

OTHER PUBLICATIONS

International Search Report for PCT International Application No. PCT/US2017/067247, dated Mar. 19, 2018, 5 pages.
(Continued)

*Primary Examiner* — Mark Kopec
*Assistant Examiner* — Jaison P Thomas
(74) *Attorney, Agent, or Firm* — Lynn R. Hunsberger (57) ABSTRACT

Conductive particles, articles including such particles, and methods of making such conductive particles, are provided; wherein the conductive particles include: a core particle including at least one of a glass, a glass-ceramic, or a metal; surface particles adhered to the core particle; and a metal coating disposed on at least a portion of the core and surface particles; wherein the core particle is larger than the surface particles.

19 Claims, 3 Drawing Sheets

50μm (51) Int. Cl.
  *C08K 3/40* (2006.01)
  *C08K 7/28* (2006.01)
  *C08K 9/08* (2006.01)
  *C09J 9/02* (2006.01)
  *C09J 11/08* (2006.01)
  *C08K 3/08* (2006.01)

(52) U.S. Cl.
  CPC  *C08K 9/08* (2013.01); *C09J 9/02* (2013.01); *C09J 11/08* (2013.01); *C08K 2003/085* (2013.01); *C08K 2003/0806* (2013.01); *C08K 2003/0831* (2013.01); *C08K 2003/0862* (2013.01); *C08K 2201/001* (2013.01)

(58) Field of Classification Search
  CPC ...... C08K 2003/0831; C08K 2003/085; C08K 2003/0862; C08K 9/02; C08K 9/08; C09J 11/04; C09J 11/08; C09J 9/02
  See application file for complete search history.

(56) References Cited

U.S. PATENT DOCUMENTS

| | | | |
|---|---|---|---|
| 4,612,242 A | 9/1986 | Vesley | |
| 4,656,213 A | 4/1987 | Schlademan | |
| 5,774,265 A | 6/1998 | Mathers | |
| 5,804,610 A | 9/1998 | Hamer | |
| 7,084,209 B2 | 8/2006 | Everaerts | |
| 7,727,931 B2 | 6/2010 | Brey | |
| 8,202,934 B2 | 6/2012 | Sherman | |
| 8,492,486 B2 | 7/2013 | Sherman | |
| 8,701,441 B2 | 4/2014 | Kramlich | |
| 2005/0158461 A1 | 7/2005 | Bescup | |
| 2009/0161058 A1 | 6/2009 | Sherman | |
| 2012/0100326 A1 | 4/2012 | Sherman | |
| 2012/0295025 A1 | 11/2012 | Sherman | |
| 2013/0316076 A1 | 11/2013 | Sherman | |
| 2013/0337260 A1 | 12/2013 | Tapio | |
| 2014/0076620 A1* | 3/2014 | Son .......................... H01B 1/02 |
| | | | 174/257 |
| 2014/0212626 A1 | 7/2014 | Kramlich | |
| 2014/0363554 A1 | 12/2014 | Hajime | |
| 2016/0333195 A1* | 11/2016 | Minami ................... C09D 5/24 |
| 2017/0310020 A1* | 10/2017 | Hirayama ................ H01B 1/22 |
| 2019/0241770 A1* | 8/2019 | Shirakawa ................ C09J 7/10 |
| 2019/0367783 A1* | 12/2019 | Shirakawa ............... C09J 11/04 |

FOREIGN PATENT DOCUMENTS

| | | |
|---|---|---|
| JP | 2003317546 | 11/2003 |
| JP | 3608214 | 1/2005 |
| WO | WO 2005-004172 | 1/2005 |
| WO | WO 2014-104017 | 7/2014 |
| WO | WO 2015-073346 | 5/2015 |

OTHER PUBLICATIONS

ECATT IP Meeting, Sep. 27, 2016, 2 pages.
Engineered Materials Handbook, vol. 4, Ceramics and Glasses, (1991, ASM).

* cited by examiner

CONDUCTIVE PARTICLES, ARTICLES, AND METHODS

CROSS REFERENCE TO RELATED APPLICATIONS

This application is a national stage filing under 35 U.S.C. 371 of PCT/US2017/067247, filed Dec. 19, 2017, which claims the benefit of U.S. Application No. 62/437,236, filed Dec. 21, 2016, the disclosure of which is incorporated by reference in its/their entirety herein.

BACKGROUND

Figure 1:
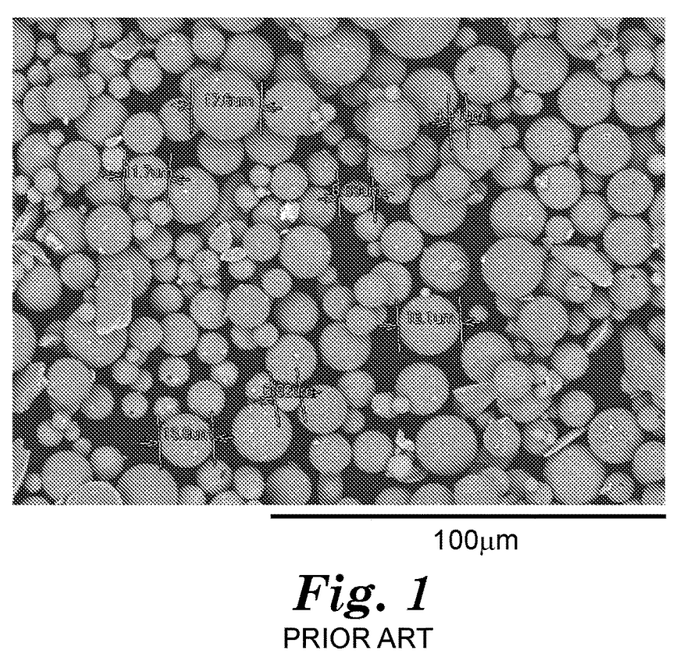
FIG. 1 (PRIOR ART). Scanning Electron Microscope (SEM) micrograph of commercially available conductive particles, obtained under the designation "CONDUCT-O-FIL TP12S16" from Potters Industries, Malvern, Pa.
Figure 2:
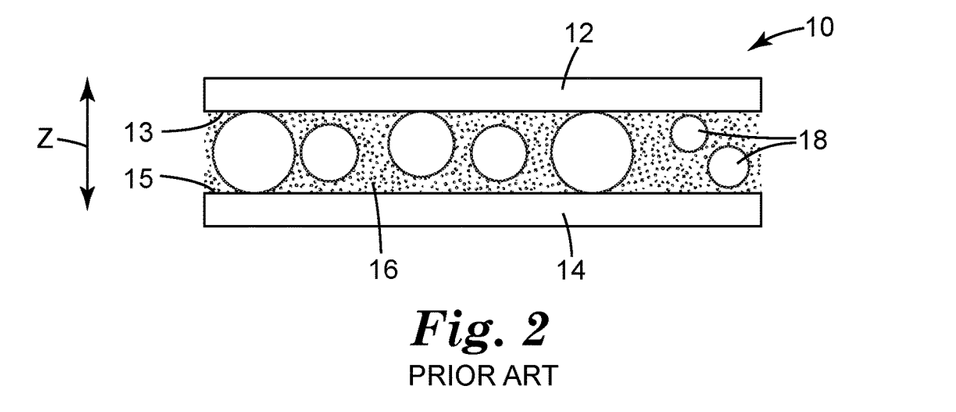
FIG. 2 (PRIOR ART). Drawing of a representative product having two conductive surfaces bonded by an adhesive matrix with commercially available conductive particles dispersed therein that bridge the gap between conductive surfaces.

Electrically conductive adhesive transfer tapes include conductive particles to bridge the gap between conductive surfaces bonded by the matrix adhesive. Examples of these particles are silver-coated glass beads and silver-coated nickel agglomerates. A representative commercial sample is shown in FIG. 1. These particles have a standard bell curve particle size distribution that leads to a construction where only the largest particles in the distribution bridge the gap between conductive substrates that need to be adhesively bonded together. This is represented by FIG. 2, which shows representative product 10 having two conductive substrates 12 and 14 with conductive surfaces 13 and 15 (e.g., metallized surfaces bonded to a substrate) bonded by adhesive matrix 16 with commercially available conductive particles 18 dispersed therein that bridge the gap between conductive surfaces.

SUMMARY

It would be desirable for conductive particles that allow for a larger conductive pathway in the z-axis if particle loadings are held the same as with commercially available particles, or that can create a cost savings by decreasing the particle loading needed to get the same conductivity as with commercially available particles. Additionally, it would be desirable for such conductive particles to have a structure with greater surface area, greater number of points of contact, and/or sharper points of contact for electrical grounding, than is available with smooth surface spherical particles. The conductive particles of the present disclosure provide one or more of these desirable characteristics.

In one aspect of the present disclosure, conductive particles are provided that include: a core particle including at least one of a glass, a glass-ceramic, or a metal; surface particles adhered to the core particle; and a metal coating disposed on at least a portion of the core and surface particles; wherein the core particle is larger than the surface particles.

In another aspect of the present disclosure, an article is provided that includes such conductive particles. Such article includes: a substrate (e.g., a liner or conductive substrate) having two major surfaces; a layer including an organic matrix disposed on a first major surface of the substrate; and conductive particles dispersed within the organic matrix.

In another aspect of the present disclosure, a method for forming conductive particles is provided. The method includes: providing precursor core particles; placing the precursor core particles in a bed including precursor surface particles; heating the bed to adhere surface particles to core particles, wherein the core particles are larger than the surface particles; and applying a metal coating to at least a portion of the core and surface particles to provide conductive particles as described herein. Precursor core particles and precursor surface particles are particles that result in core particles and surface particles during the process of forming particles. Such precursor particles can change significantly (e.g., change shape by sintering to form spheres), can change very little, or remain unchanged during the processing of the conductive core particles.

The terms "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of" Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a," "an," and "the" are not intended to refer to only a singular entity, but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements (e.g., preventing and/or treating an affliction means preventing, treating, or both treating and preventing further afflictions).

Also herein, all numbers are assumed to be modified by the term "about" and preferably by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

Reference throughout this specification to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout this specification are not necessarily referring to the same embodiment of the disclosure. Furthermore, the particular features, configurations, compositions, or characteristics may be combined in any suitable manner in one or more embodiments.

As used herein, the term "room temperature" refers to a temperature of about 20° C. to about 25° C. or about 22° C. to about 25° C.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION

The present disclosure provides conductive particles that include: a core particle including at least one of a glass, a glass-ceramic, or a metal; surface particles adhered to the core particle; and a metal coating disposed on at least a portion of the core and surface particles; wherein the core particle is larger than each of the surface particles.

Figure 3:
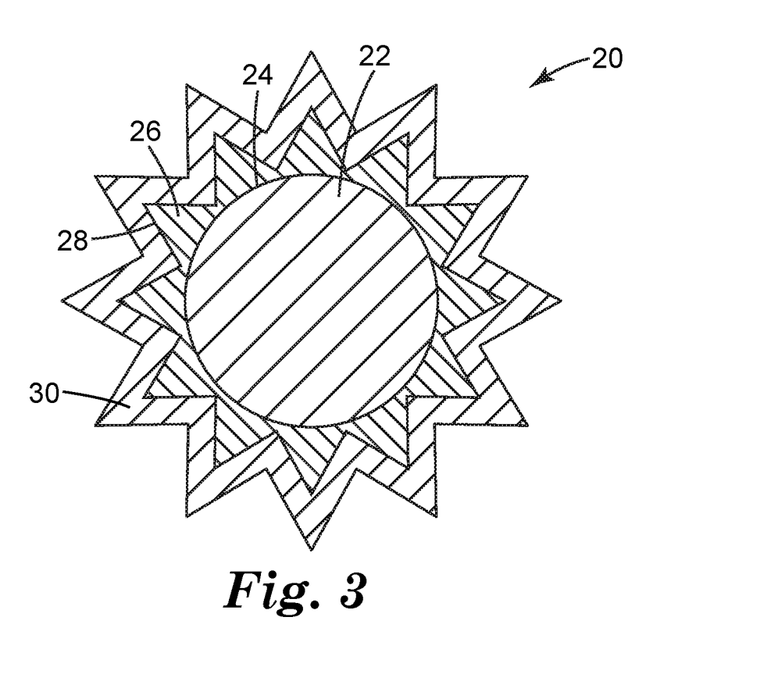
FIG. 3. A representation of a conductive particle that includes a core particle having surface particles and a metal coating on exposed surfaces of the core particle and surface particles (not necessarily shown to actual scale).
Figure 4:
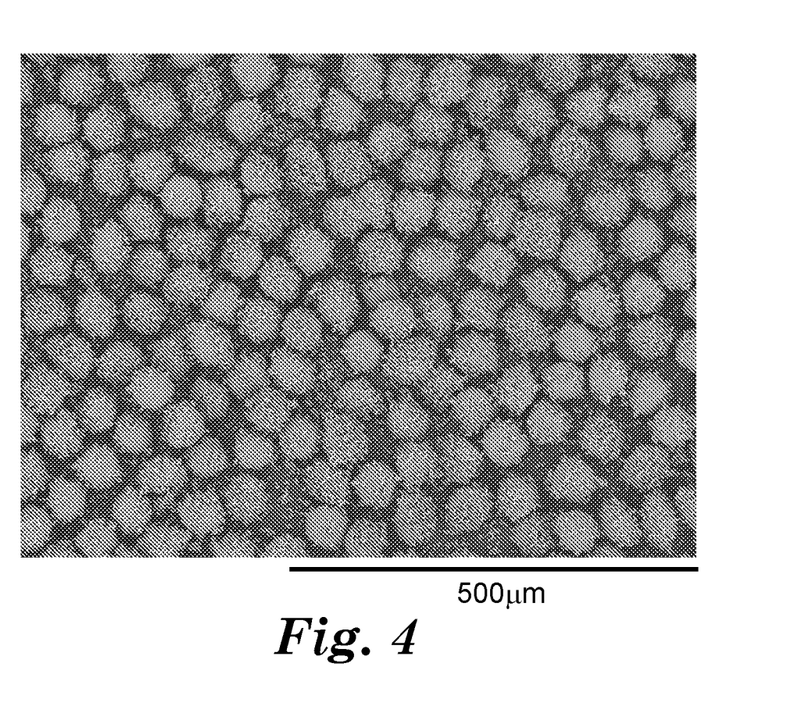
FIG. 4. SEM of a representative sample of conductive particles of the present disclosure.

As seen in FIG. 3, conductive particle 20 includes core particle 22 having exposed surface 24, surface particles 26 having exposed surfaces 28, and metal coating 30 on exposed surfaces 24 and 28 of core particle 22 and surface particles 26, respectively. In this context, an "exposed surface" is a surface of a core particle or a surface particle that is not involved in adhering of the surface particles to the core particle (i.e., the adhered surfaces). FIG. 4 shows an SEM micrograph of a representative sample of conductive particles of the present disclosure.

Figure 5:
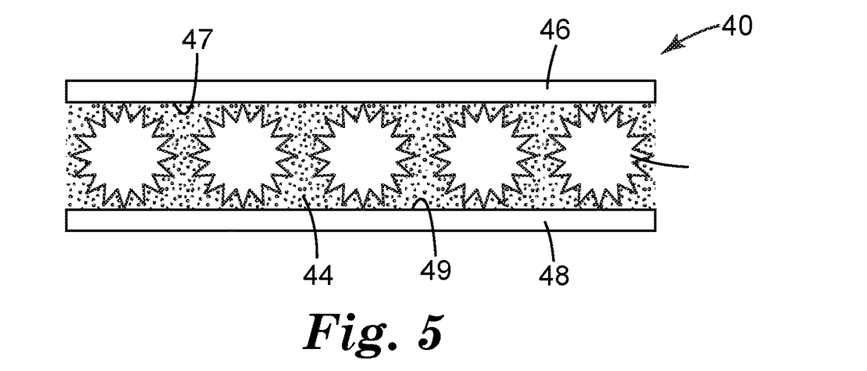
FIG. 5. Drawing of a representative product or article having a sample of conductive particles in an adhesive matrix of the present disclosure shown in a final product having two conductive surfaces, wherein the adhesive matrix with conductive particles dispersed therein bridge the gap between conductive surfaces (not necessarily shown to actual scale).

Such conductive particles can be used in a final product having two conductive surfaces (e.g., metallized surfaces bonded to a conductive substrate) bonded by an adhesive matrix with conductive particles of the present disclosure dispersed therein. This is demonstrated by FIG. 5, which is a drawing of a product 40 that includes a representative sample of conductive particles 42 in an adhesive matrix 44 of the present disclosure that bridges the gap between conductive substrates 46 and 48 having conductive surfaces 47 and 49, respectively.

Such particles allow for a larger conductive pathway in the z-axis if particle loadings are held the same as with commercially available particles, and/or a cost savings as a result of lower particle loading needed to get the same conductivity as commercially available particles. In certain embodiments, the conductive particles of the present disclosure have a structure with greater surface area, greater number of points of contact, and/or sharper points of contact for electrical grounding, than is available with smooth surface spherical particles, as compared to conventional materials shown in FIG. 2.

In certain embodiments, the conductive particles provide conductivity in one direction (e.g., the z-direction), and in other embodiments, the conductive particles provide conductivity in the z-direction and the x-y plane.

The "particle size" of a particle is the largest dimension of the particle, which is the diameter of a sphere. "Average" particle size is determined on the particles using commercially available laser diffraction particle size measurement equipment (available under the trade designation "COULTER LS 12 320 SW DRY POWDER SYSTEM" from Beckman Coulter, Indianapolis, Ind.). Such analysis yields such parameters as $d_{90}$ (90% of the particles are smaller than the $d_{90}$ parameter), $d_{50}$ (50% of the particles are smaller than the $d_{50}$ parameter), $d_{10}$ (10% of the particles are smaller than the $d_{10}$ parameter). In certain embodiments, a representative sample of the particles of the present disclosure possesses core particles having a uniform particle size. In this context, "uniform" particle size means that the particles have a $d_{10}$ and a $d_{90}$ value each within ±30%, or within ±20%, or within ±10%, of the average particle size ($d_{50}$).

In certain embodiments, core particles or precursor core particles having a uniform particle size can be made, for example, via a micro-replication process that sets the bounds of the size of the particles or precursor core particles, as described in U.S. Pat. No. 8,701,441 (Kramlich et. al.). Such core particles or precursor core particles of uniform particle size can then be subjected to a high temperature processing step to adhere (e.g., fuse) smaller particles (e.g., abrasive particles) to the surface of the larger core particles. The resultant particles can then be coated with a highly conductive material (a metal) to generate a final conductive particle to be used as an electrically conductive filler for adhesive films.

In certain embodiments, the core particles of a sample of conductive particles have an average particle size (i.e., largest dimension, which is the diameter of a sphere) of at least 10 micrometers (i.e., microns), or at least 20 micrometers, or at least 30 micrometers, or at least 40 micrometers, or at least 50 micrometers. In certain embodiments, the core particles of a sample of conductive particles have an average particle size of up to (i.e., at most) 200 micrometers.

In certain embodiments, an individual core particle of a conductive particle has a particle size of at least 10 micrometers, or at least 20 micrometers, or at least 30 micrometers, or at least 40 micrometers, or at least 50 micrometers. In certain embodiments, an individual core particle of a conductive particle has a particle size of up to 200 micrometers.

The surface particles of conductive particles of the present disclosure are smaller than the core particle to which the surface particles are adhered. In certain embodiments, the surface particles of a conductive particle, or a sample of conductive particles, have an average particle size (i.e., largest dimension, which is the diameter of a sphere) of up to 10 micrometers. In certain embodiments, the surface particles of a conductive particle, or a sample of conductive particles, have an average particle size of at least 0.1 micrometer, or at least 0.2 micrometer, or at least 0.3 micrometer, or at least 0.4 micrometer, or at least 0.5 micrometer, or at least 1 micrometer, or at least 2 micrometers. In certain embodiments, each surface particle has a particle size of up to 10 micrometers. In certain embodiments, each surface particle has a particle size of at least 0.1 micrometer, or at least 0.2 micrometer, or at least 0.3 micrometer, or at least 0.4 micrometer, or at least 0.5 micrometer, or at least 1 micrometer, or at least 2 micrometers.

In some embodiments, when comparing individual core particles to surface particles, the ratio of the particle size of a surface particle to the particle size of a core particle is at least 0.01:1 (e.g., a 1-micrometer surface particle and a 100-micrometer core particle), or at least 0.02:1, or at least 0.03:1, or at least 0.04:1, or at least 0.05:1. When comparing individual core particles to a sample of surface particles, the ratio of the average particle size of the surface particles to the particle size of a core particle is at least 0.01:1 (e.g., average of 1 micrometer for the surface particles and a 100-micrometer core particle), or at least 0.02:1, or at least 0.03:1, or at least 0.04:1, or at least 0.05:1. When comparing a sample of core particles to a sample of surface particles, the ratio of the average particle size of the surface particles to the average particle size of the core particles is at least 0.01:1 (e.g., average of 1 micrometer for the surface particles and average of 100 micrometers for the core particle), or at least 0.02:1, or at least 0.03:1, or at least 0.04:1, or at least 0.05:1.

In some embodiments, when comparing individual core particles to surface particles, the ratio of the particle size of a surface particle to the particle size of a core particle is up to 0.2:1, or up to 0.3:1, or up to 0.4:1, or up to 0.5:1 (e.g., a 1-micrometer surface particle and a 2-micrometer core particle). When comparing individual core particles to a sample of surface particles, the ratio of the average particle size of the surface particles to the particle size of a core particle is up to 0.2:1, or up to 0.3:1, or up to 0.4:1, or up to 0.5:1 (e.g., average of 1 micrometer for the surface particles and a 2-micrometer core particle). When comparing a sample of core particles to a sample of surface particles, the ratio of the average particle size of the surface particles to the average particle size of the core particles is up to 0.2:1, or up to 0.3:1, or up to 0.4:1, or up to 0.5:1 (e.g., average of 1 micrometer for the surface particles and average of 2 micrometers for the core particle).

The core particle includes at least one of a glass, a glass-ceramic, or a metal. If the core particle includes a metal, the metal of the core and the metal of the coating may be the same or different. In certain embodiments, the metal of the coating is different than the metal of the core. Thus, a lower cost metal may be used in the core and a more expensive conductive metal may be used for the coating.

In certain embodiments, the metal of the metal coating (whether coating a core particle made of metal, glass, or glass-ceramic) may be selected from silver, gold, platinum, palladium, nickel, copper, aluminum, and a combination thereof. In certain embodiments, the metal of the metal coating may be selected from silver, gold, platinum, palladium, nickel, copper, and a combination thereof. In certain embodiments, it is preferred that such metals do not possess a passivation layer. In certain embodiments, the metal of the metal coating is silver.

Such metal coating can be deposited by a variety of techniques, such as sputtering or chemical vapor deposition. Coatings of up to 10 micrometers, or up to 5 micrometers, or up to 1 micrometer may be deposited on core particles described herein. As long as there is a metal coating on the core particles, there is no minimum coating thickness.

In certain embodiments, the amount of the metal deposited on the particles is at least 1 percent by weight (wt-%) of the conductive particles. In certain embodiments, the amount of the metal deposited on the particles is up to 50 percent by weight (wt-%) of the conductive particles.

In certain embodiments, the metal coating disposed on the core particles and surface particles is of a uniform thickness. In this context, "uniform" thickness means at least 80% of the surface area of the exposed surfaces has a metal coating that varies by no more than ±50% in thickness around the surface of a conductive particle.

In certain embodiments, the core of the conductive particles includes a metal. In certain embodiments, the metal of the core may be selected from silver, gold, platinum, palladium, nickel, copper, aluminum, lead, tin, and a combination thereof.

In certain embodiments, the core of the conductive particles includes at least one of a glass or a glass-ceramic. Such materials are described in detail in *Engineered Materials Handbook, Volume* 4 *Ceramics and Glasses*, (1991, ASM). Therein, glass and glass-ceramic are defined as follows. "Glass" is an inorganic product of fusion that has cooled to a rigid condition without crystallizing. Glass is typically hard and brittle, and has a conchoidal fracture. A glass may be colorless or colored. It is usually transparent, but can be made translucent or opaque. When a specific kind of glass is indicated, such descriptive terms as flint glass, barium glass, and window glass should be used following the basic definition, but the qualifying term is to be used as understood by trade custom. Objects made of glass are loosely and popularly referred to as glass, such as a glass for a tumbler, a barometer, a window, a magnifier, or a mirror. "Glass-ceramics" are polycrystalline materials formed by the controlled crystallization of specialty glasses. They are differentiated from phase separated glasses by their high crystallinity. Glass-ceramics are by definition greater than or equal to 50% crystalline by volume and generally greater than 90% crystalline. The range of glass-ceramic compositions is extremely broad, requiring only the ability to form a glass and control its crystallization.

In certain embodiments, the starting materials (i.e., precursor particles) for a glass or glass-ceramic core include sinterable agglomerates of fine particles that can be heated to densify and at least partially spheroidize, or solid particle materials that can be heated to change shape or be softened for rounding and adhering surface particles. Exemplary starting solid particles (i.e., precursor particles) may have a shape selected from polyhedron, parallelepiped, diamond, cylinder, arcuate, arcuate cylinder, rounded (e.g., oval or spherical or equiaxial), hemisphere, gumdrop, bell, cone, frustoconical cone, irregular, and mixtures thereof.

Examples of such materials include traditional silicate glass chemistries such as soda lime silicate glasses (e.g., window glass and container glass) and borosilicate glasses (such as those available under the trade designations "PYREX" from Corning Inc., Corning, N.Y., or "DURAN" from SCHOTT North America Inc., Elmsford, N.Y.), glass-ceramic lithium aluminum silicate (such as that used in a cooktop under the trade designation "CERAN" from Schott North America, Inc., Elmsford, N.Y.), magnesium aluminosilicate (e.g., cordierite), vitreous enamel (e.g., porcelain), and low temperature lead and lead-free glasses (available from 3M Specialty Glass, St. Paul, Minn.).

In certain embodiments, the conductive particles include a core particle that has a shape selected from polyhedron, parallelepiped, diamond, cylinder, arcuate, arcuate cylinder, rounded (e.g., oval or spherical or equiaxial), hemisphere, gumdrop, bell, cone, frustoconical cone, irregular, and mixtures thereof. In certain embodiments, the conductive particles include a core particle that has a rounded shape (e.g., oval or spherical or equiaxial).

In certain embodiments, the core particle has an aspect ratio of less than 3:1, or less than 2:1, or less than 1.5:1, or less than 1.2:1, or 1:1. In certain embodiments, the core particle is spherical (with an aspect ratio of 1:1). Core particles having a spherical shape are advantageous because there is no need for special orientation to provide conductivity between substrates.

In certain embodiments, core particles having a spherical shape can be prepared readily from a sintered process using agglomerates of fine particles or from solid particles that can be softened when heated to adhere the surface particles. These processes result in well adhered (e.g., fused) surface particles.

In certain embodiments, the surface particles adhered (e.g., fused) to the core particle have a shape selected from polyhedron, parallelepiped, diamond, cylinder, arcuate, arcuate cylinder, rounded (e.g., oval or spherical or equiaxial), hemisphere, gumdrop, bell, cone, frustoconical cone, irregular, and mixtures thereof. In certain embodiments, the surface particles adhered (e.g., fused) to the core particle have a shape having at least one of sharp edges or sharp corners. Sharp edges and/or corners typically provide better contact with substrates and better conductivity. Regardless of the shape of the surface particles, they provide more contact points between substrates relative to no surface particles. Thus, even spherical surface particles provide advantage.

In certain embodiments, the surface particles of the conductive particles of the present disclosure are inorganic particles. Desirably, the material of the surface particles is a heat-resistant, hard, inorganic material that can withstand high temperatures (e.g., sintering temperatures such as temperatures of at least 400° C., at least 600° C., at least 800° C., at least 1000° C., at least 1200° C., or at least 1400° C.) with little or no change in shape. In certain embodiments, the inorganic surface particles include alumina, silica, zirconia, silicon carbide, diamond, aluminum nitride, silicon nitride, boron nitride, cemented carbide, stainless steel, or mixtures thereof. Such particles may or may not be abrasive. Examples of inorganic surface particles include plate calcined alumina available under the trade designation "PWA" from Fujimi, Tualatin, Oreg., and silicon carbide available under the trade designation "CARBOREX F1200" from Washington Mills, North Grafton, Mass.

The present disclosure also provides an article that includes: a substrate (e.g., a liner or a conductive substrate) having two major surfaces; a layer that includes an organic matrix disposed on a first major surface of the substrate; and conductive particles (as described herein) dispersed within the organic matrix.

Figure 6:
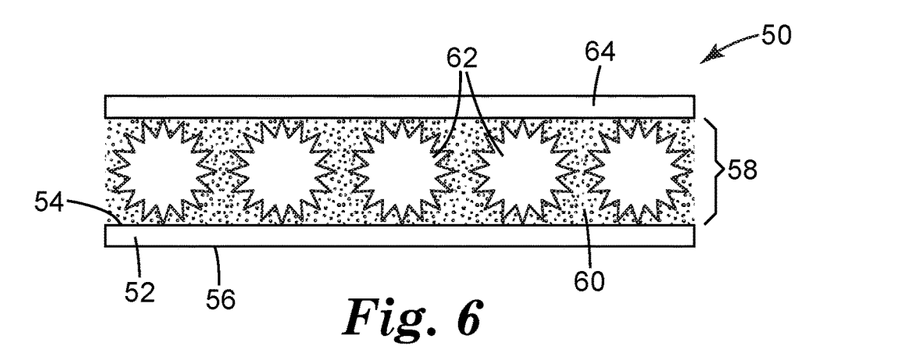
FIG. 6. A representation of an article that includes a substrate (e.g., a liner or a conductive substrate) having two major surfaces, a layer that includes an organic matrix disposed on a first major surface of the substrate, and conductive particles of the present disclosure dispersed within the organic matrix (not necessarily shown to actual scale).

As seen in FIG. 6, article 50 includes a substrate 52 having two major surfaces 54 and 56, layer 58 that includes an organic matrix 60 disposed on first major surface 54 of substrate 52, and conductive particles 62 (as described herein) dispersed within organic matrix 60. Optionally, release liner 64 may be disposed on layer 58 that includes an organic matrix 60 and conductive particles 62.

In certain embodiments, substrate 52 of article 50 (FIG. 6) has a thickness of up to 1 mm, up to 500 micrometers, up to 100 micrometers, up to 50 micrometers, or up to 25 micrometers. In certain embodiments, substrate 52 of article 50 has a thickness of at least 10 micrometers.

In certain embodiments, substrate 52 of article 50 (FIG. 6) may be flexible. In this context, "flexible" refers to a substrate that will fit around the curvatures found (e.g., in electronic device applications without breaking).

In certain embodiments, substrate 52 of article 50 (FIG. 6) is a conductive substrate and includes a metal foil, a metal mesh, or a metal-coated substrate. In certain embodiments, the conductive substrate includes a metal-coated substrate. In certain embodiments, the conductive substrate includes a metal selected from silver, gold, platinum, palladium, nickel, copper, aluminum and a combination thereof.

In certain embodiments, substrate 52 of article 50 (FIG. 6) includes a polymer film, which may be a liner (e.g., a release liner). In certain embodiments, the polymer film includes polyethylene terephthalate, polyethylene naphthalate, polyimide, polyolefin (e.g., polyethylene, polypropylene), or a combination thereof. In certain embodiments, substrate 52 is conductive and includes a metal-coated polymer film comprising polyethylene, polypropylene, polyethylene terephthalate, polyethylene naphthalate, polyimide, polyolefin (e.g., polyethylene, polypropylene), or a combination thereof.

In certain embodiments, organic matrix 60 of article 50 (FIG. 6) includes an adhesive. Those skilled in the art will be able to select suitable adhesives, for example and without limitation, hot melt adhesives, heat activated adhesives, pressure sensitive adhesives, or combinations thereof, as described herein, dependent in large part upon the desired application of the conductive article.

Illustrative suitable tackified rubber hot melt adhesives are disclosed in U.S. Pat. No. 4,125,665 (Bemmels et al.) and U.S. Pat. No. 4,152,231 (St. Clair et al.). Illustrative suitable acrylic hot melt adhesives are disclosed in U.S. Pat. No. 4,656,213 (Schlademan) and U.S. Pat. No. 5,804,610 (Hamer et al.). Further illustrative adhesives that may be applied as hot melt adhesives suitable for use with articles of the disclosure are disclosed in U.S. Pat. No. 8,492,486 (Sherman), U.S. Pat. No. 8,202,934 (Sherman), and U.S. Pat. No. 7,084,209 (Everaerts).

Heat activated adhesives are non-tacky at room temperature but become tacky and capable of bonding to a substrate at elevated temperatures. These adhesives usually have a $T_g$ (glass transition temperature) or melting point ($T_m$) above room temperature. When the temperature is elevated above the $T_g$ or $T_m$, the storage modulus usually decreases and the adhesive becomes tacky. Examples of suitable heat activated adhesives include polyacrylate hot melt adhesives, polyvinyl butyrals, ethylene vinyl acetate, ionomers, polyolefins, or combinations thereof.

Pressure sensitive adhesive (PSA) compositions are well known to those of ordinary skill in the art to possess properties including the following: (1) aggressive and permanent tack, (2) adherence with no more than finger pressure, (3) sufficient ability to hold onto an adherend, and (4) sufficient cohesive strength to be cleanly removable from the adherend. Materials that have been found to function well as PSAs are polymers designed and formulated to exhibit the requisite viscoelastic properties resulting in a desired balance of tack, peel adhesion, and shear holding power. Pressure sensitive adhesives useful in the present invention include tackified natural rubbers, synthetic rubbers, tackified styrene block copolymers, polyvinyl ethers, acrylics, poly-o-olefins, and silicones. Illustrative pressure sensitive adhesives that are suitable for use in the invention are described in U.S. Pat. Appl. Pub. Nos. 2013/0337260 (Tapio et al.), 2013/0316076 (Sherman), 2012/0295025 (Sherman et al.), 2012/0100326 (Sherman et al.), and 2009/0161058 (Sherman).

Conductive particles 62 of article 50 (FIG. 6) are those described herein. In certain embodiments, the conductive particles are dispersed (in certain embodiments, uniformly dispersed) in the organic matrix in an amount of at least 0.1, at least 1, at least 5, at least 10, at least 15, or at least 20 volume percent (vol-%), based on the volume of the organic matrix and conductive particles. The conductive particles dispersed in the organic matrix include core particles of uniform particle size.

In certain embodiments, a majority of conductive particles 62 dispersed in organic matrix 60 of article 50 (FIG. 6) include a core particle including at least one of a glass, a glass-ceramic, or a metal, surface particles adhered to the core particle, and a metal coating disposed on at least a portion of the core and surface particles, wherein the core particle is larger than the surface particles. Mixtures of such particles can be used; although in certain embodiments, a majority of the conductive particles dispersed in the organic matrix include the same type of core particle and type of surface particles.

In certain embodiments, organic matrix 60 (FIG. 6) may include other particles in addition to the conductive particles of the present disclosure. Such other particles may or may not be conductive. Examples of such other (i.e., secondary) particles include inorganic nanoparticles to modify adhesive properties.

In certain embodiments, layer 58 (FIG. 6) that includes organic matrix 60 and conductive particles 62 has a thickness of at least 10 micrometers. In certain embodiments, layer 58 that includes an organic matrix 60 and conductive particles 62 has a thickness of at least 25 micrometers. In certain embodiments, layer 38 that includes organic matrix 60 and conductive particles 62 has a thickness of up to 1 mm.

Optional release liner 64 shown in FIG. 6 may be disposed on layer 58 that includes organic matrix 60 and conductive particles 62. The release liner is formed from, or coated with, a material that releases cleanly from the organic matrix (e.g., adhesive) when peeled off by the end user. The release liner may or may not be conductive. Such release liners are well known by those of skill in the art. A wide variety of conventionally employed release liners are suitably applied to organic matrix 40. For example, if organic matrix 40 includes an adhesive, silicone-coated paper may be used as a release liner.

In alternative embodiments, substrate 52 in FIG. 6 may be a release liner. Thus, certain articles of the present disclosure may have a conductive substrate and a release liner, one release liner and no conductive substrate, or two release liners.

The present disclosure further provides a method for forming conductive particles. In certain embodiments, the method includes: providing precursor core particles; placing the precursor core particles in a bed that includes precursor surface particles; heating the bed to adhere surface particles to core particles, wherein the core particles are larger than the surface particles; and applying a metal coating to at least a portion of the core and surface particles to provide conductive particles as described herein.

In certain embodiments, core particles or precursor core particles having a uniform particle size can be made, for example, via a micro-replication process that sets the bounds of the size of the particles. For example, the core particles can be produced by micro-replicating a milled glass slurry (precursor core particles). Such uniform sized particles are then subjected to a high temperature processing step to adhere surface particles to the surface of the resulting glass core particles.

In certain embodiments, the precursor core particles include agglomerates that include fine particles. In such precursor core particles, the fine particles are subjected to heat and are at least partially sintered or fused to form agglomerates. In certain embodiments for such agglomerate precursor core particles, the heating step includes heating the bed that includes precursor surface particles and precursor core particles at a temperature and for a time sufficient to at least partially spheroidize the agglomerates and adhere the surface particles to the core particle.

In certain embodiments, the precursor core particles include solid core particles. In certain embodiments for such solid core precursor particles, the heating step includes heating the bed that includes precursor surface particles and precursor core particles at a temperature and for a time sufficient to at least partially soften the precursor core particle and to adhere the surface particles to the core particle.

In certain embodiments, the heating step involves heating at a temperature of at least 400° C. In certain embodiments, the heating step involves heating at a temperature of up to 1600° C.

In certain embodiments, the heating step includes heating for a time of at least 1 minute. In certain embodiments, the heating step includes heating for a time of up to 24 hours.

The particles containing a core particle and surface particles adhered thereto are typically cooled and subsequently coated with a highly conductive material to generate a final conductive particle. Certain embodiments of the method of making such conductive particles include applying a metal coating to at least a portion of the core and surface particles.

Such metal coating step can be carried out by a wide variety of techniques, including, for example, sputtering the metal coating. Alternatively, chemical vapor deposition can be used. Such techniques are well known to those skilled in the art, and may involve dynamic mixing during the coating process to achieve a uniform coating of metal on the surface of the particles. Deposition of metal coatings from solutions or liquids (e.g., metal plating) can also be used.

EXEMPLARY EMBODIMENTS

Embodiment 1 is conductive particles, wherein a conductive particle comprises: a core particle comprising at least one of a glass, a glass-ceramic, or a metal; surface particles adhered to the core particle; and a metal coating disposed on at least a portion of the core and surface particles; wherein the core particle is larger than the surface particles.

Embodiment 2 is the conductive particles of embodiment 1 wherein the conductive particle comprises surface particles fused to the core particle.

Embodiment 3 is the conductive particles of embodiment 1 or 2 wherein the core particle comprises a metal and the metal coating comprises a different metal than that of the core particle.

Embodiment 4 is the conductive particles of embodiment 1 or 2 wherein the core particle comprises a metal and the metal coating comprises the same metal as that of the core particle.

Embodiment 5 is the conductive particles of embodiment 3 or 4 wherein the core metal is selected from silver, gold, platinum, palladium, nickel, copper, aluminum, lead, tin, and a combination thereof.

Embodiment 6 is the conductive particles of embodiment 1 or 2 wherein the core particle comprises at least one of a glass or a glass-ceramic.

Embodiment 7 is the conductive particles of any of embodiments 1 to 6 wherein the core particle has a rounded shape (e.g., oval or spherical or equiaxial).

Embodiment 8 is the conductive particles of any of embodiments 1 to 7 wherein the core particle has an aspect ratio of less than 3:1, or less than 2:1, or less than 1.5:1, or less than 1.2:1, or 1:1.

Embodiment 9 is the conductive particles of embodiment 8 wherein the core particle is spherical (with an aspect ratio of 1:1).

Embodiment 10 is the conductive particles of any of embodiments 1 to 9 wherein the core particle has a particle size (i.e., largest dimension, which is the diameter of a sphere) of at least 10 micrometers, or at least 20 micrometers, or at least 30 micrometers, or at least 40 micrometers, or at least 50 micrometers.

Embodiment 11 is the conductive particles of any of embodiments 1 to 10 wherein the core particle has a particle size of up to 200 micrometers.

Embodiment 12 is the conductive particles of any of embodiments 1 to 11 wherein the surface particles adhered (e.g., fused) to the core particle have a shape selected from polyhedron, parallelepiped, diamond, cylinder, arcuate, arcuate cylinder, rounded (e.g., oval or spherical or equiaxial), hemisphere, gumdrop, bell, cone, frustoconical cone, irregular, and mixtures thereof.

Embodiment 13 is the conductive particles of any of embodiments 1 to 12 wherein the surface particles adhered (e.g., fused) to the core particle have a shape comprising at least one of sharp edges or sharp corners.

Embodiment 14 is the conductive particles of any of embodiments 1 to 13 wherein the surface particles have an average particle size (i.e., largest dimension, which is the diameter of a sphere) of at least 0.1 micrometer, or at least 0.2 micrometer, or at least 0.3 micrometer, or at least 0.4 micrometer, or at least 0.5 micrometer, or at least 1 micrometer, or at least 2 micrometers.

Embodiment 15 is the conductive particles of any of embodiments 1 to 14 wherein the surface particles have an average particle size (i.e., largest dimension) of up to 10 micrometers.

Embodiment 16 is the conductive particles of any of embodiments 1 to 15 wherein the metal coating is present in an amount of at least 1 wt-% and up to 50 wt-% of the conductive particles.

Embodiment 17 is the conductive particles of embodiment 16 wherein the average particle size of the surface particles to the particle size of the core is at least 0.01:1, or at least 0.02:1, or at least 0.03:1, or at least 0.04:1, or at least 0.05:1.

Embodiment 18 is the conductive particles of embodiment 16 or 17 wherein the average particle size of the surface particles to the particle size of the core is up to 0.2:1, or up to 0.3:1, or up to 0.4:1, or up to 0.5:1.

Embodiment 19 is the conductive particles of any of embodiments 1 to 18 wherein the surface particles comprise inorganic particles.

Embodiment 20 is the conductive particles of embodiment 19 wherein the inorganic surface particles comprise alumina, silica, zirconia, silicon carbide, diamond, aluminum nitride, silicon nitride, boron nitride, cemented carbide, stainless steel, or mixtures thereof.

Embodiment 21 is the conductive particles of any of embodiments 1 to 20 wherein the core and surface particles have a uniform metal coating on exposed surfaces thereof.

Embodiment 22 is the conductive particles of any of embodiments 1 to 21 wherein the metal coating disposed on the core particles and surface particles is of a uniform thickness.

Embodiment 23 is the conductive particles of embodiment 22 wherein the metal coating has a thickness of up to 10 micrometers, or up to 5 micrometers, or up to 1 micrometer.

Embodiment 24 is the conductive particles of any of embodiments 1 to 23 wherein the metal coating comprises a metal selected from silver, gold, platinum, palladium, nickel, copper, aluminum, and a combination thereof.

Embodiment 25 is the conductive particles of embodiment 24 wherein the metal coating comprises a metal selected from silver, gold, platinum, palladium, nickel, copper, and a combination thereof.

Embodiment 26 is the conductive particles of embodiment 25 wherein the metal coating comprises silver.

Embodiment 27 is the conductive particles of any of embodiments 1 to 26 dispersed in an organic matrix.

Embodiment 28 is the conductive particles of embodiment 27 wherein the organic matrix comprises an adhesive.

Embodiment 29 is the conductive particles of embodiment 27 or 28 wherein the organic matrix comprises at least 1, or at least 5, or at least 10, or at least 15, or at least 20 volume percent conductive particles, based on the volume of the organic matrix and conductive particles.

Embodiment 30 is the conductive particles of any of embodiments 27 to 29 wherein the conductive particles dispersed in the organic matrix comprise core particles of uniform particle size.

Embodiment 31 is the conductive particles of any of embodiments 27 to 30 wherein a majority of the conductive particles dispersed in the organic matrix comprise: a core particle comprising at least one of a glass, a glass-ceramic, or a metal; surface particles adhered to the core particle; and a metal coating disposed on at least a portion of the core and surface particles; wherein the core particle is larger than the surface particles.

Embodiment 32 is the conductive particles of embodiment 31 wherein a majority of the conductive particles dispersed in the organic matrix comprise the same type of core particle and surface particles.

Embodiment 33 is the conductive particles of any of embodiments 27 to 29 wherein the conductive particles are uniformly distributed throughout the organic matrix.

Embodiment 34 is an article comprising: a substrate (e.g., a liner or a conductive substrate) having two major surfaces; a layer comprising an organic matrix disposed on a first major surface of the substrate; and conductive particles dispersed within the organic matrix; wherein a conductive particle comprises: a core particle comprising at least one of a glass, a glass-ceramic, or a metal; surface particles adhered (e.g., fused) to the core particle; and a metal coating disposed on at least a portion of the core and surface particles; wherein the core particle is larger than the surface particles.

Embodiment 35 is the article of embodiment 34 wherein the substrate is flexible.

Embodiment 36 is the article of embodiment 34 or 35 wherein the substrate is a conductive substrate comprising a metal selected from silver, gold, platinum, palladium, nickel, copper, aluminum, and a combination thereof.

Embodiment 37 is the article of any of embodiments 34 to 36 wherein the substrate comprises a metal foil, a metal mesh, or a metal-coated substrate.

Embodiment 38 is the article of any of embodiments 34 to 37 wherein the substrate has a thickness of less than 1 mm.

Embodiment 39 is the article of embodiment 37 or 38 wherein the substrate comprises a metal-coated substrate.

Embodiment 40 is the article of embodiment 39 wherein the substrate comprises a metal-coated polymer film comprising polyethylene, polypropylene, polyethylene terephthalate, polyethylene naphthalate, polyimide, polyolefin (e.g., polyethylene, polypropylene), or a combination thereof.

Embodiment 41 is the article of any of embodiments 34 to 40 wherein the organic matrix comprises at least 1, or at least 5, or at least 10, or at least 15, or at least 20 volume percent conductive particles, based on the volume of the organic matrix and conductive particles.

Embodiment 42 is the article of any of embodiments 34 to 41 wherein the organic matrix comprises an adhesive.

Embodiment 43 is the article of any of embodiments 34 to 42 wherein the conductive particles dispersed in the organic matrix comprise core particles of uniform particle size.

Embodiment 44 is the article of any of embodiments 34 to 43 wherein a majority of the conductive particles dispersed in the organic matrix comprise: a core particle comprising at least one of a glass, a glass-ceramic, or a metal; surface particles adhered to the core particle; and a metal coating disposed on at least a portion of the core and surface particles; wherein the core particle is larger than the surface particles.

Embodiment 45 is the article of embodiment 44 wherein a majority of the conductive particles dispersed in the organic matrix comprise the same type of core particle and surface particles.

Embodiment 46 is the article of any of embodiments 34 to 45 wherein the conductive particles are uniformly distributed throughout the organic matrix.

Embodiment 47 is the article of any of embodiments 34 to 45 further comprising a release liner disposed on the layer comprising an organic matrix.

Embodiment 48 is the article of any of embodiments 34 to 47 further comprising a second substrate disposed on the layer comprising an organic matrix.

Embodiment 49 is the article of any of embodiments 34 to 48 further comprising a second layer comprising an organic matrix disposed on a second major surface of the substrate.

Embodiment 50 is the article of embodiment 49 further comprising a release liner disposed on the second layer comprising an organic matrix.

Embodiment 51 is the article of any of embodiments 34 to 50 wherein the conductive particle comprises surface particles fused to the core particle.

Embodiment 52 is the article of any of embodiments 34 to 51 wherein the core particle comprises a metal and the metal coating comprises a different metal than that of the core particle.

Embodiment 53 is the article of any of embodiments 34 to 52 wherein the core particle comprises at least one of a glass or a glass-ceramic.

Embodiment 54 is the article of any of embodiments 34 to 53 wherein the core particle has a rounded shape (e.g., oval or spherical or equiaxial).

Embodiment 55 is the article of any of embodiments 34 to 54 wherein the core particle has an aspect ratio of less than 3:1, or less than 2:1, or less than 1.5:1, or less than 1.2:1, or 1:1.

Embodiment 56 is the article of embodiment 55 wherein the core particle is spherical (with an aspect ratio of 1:1).

Embodiment 57 is the article of any of embodiments 34 to 56 wherein the surface particles adhered (e.g., fused) to the core particle have a shape comprising at least one of sharp edges or sharp corners.

Embodiment 58 is the article of any of embodiments 34 to 57 wherein the core particle has a particle size (i.e., largest dimension, which is the diameter of a sphere) of at least 10 micrometers, or at least 20 micrometers, or at least 30 micrometers, or at least 40 micrometers, or at least 50 micrometers.

Embodiment 59 is the article of any of embodiments 34 to 58 wherein the core particle has a particle size of up to 200 micrometers.

Embodiment 60 is the article of any of embodiments 34 to 59 wherein the surface particles adhered (e.g., fused) to the core particle have a shape selected from polyhedron, parallelepiped, diamond, cylinder, arcuate, arcuate cylinder, rounded (e.g., oval or spherical or equiaxial), hemisphere, gumdrop, bell, cone, frustoconical cone, irregular, and mixtures thereof.

Embodiment 61 is the article of any of embodiments 34 to 60 wherein the surface particles have an average particle size (i.e., largest dimension, which is the diameter of a sphere) of at least 0.1 micrometer, or at least 0.2 micrometer, or at least 0.3 micrometer, or at least 0.4 micrometer, or at least 0.5 micrometer, or at least 1 micrometer, or at least 2 micrometers.

Embodiment 62 is the article of any of embodiments 34 to 61 wherein the surface particles have an average particle size of up to 10 micrometers.

Embodiment 63 is the article of embodiment 62 wherein the average particle size of the surface particles to the particle size of the core is at least 0.01:1, or at least 0.02:1, or at least 0.03:1, or at least 0.04:1, or at least 0.05:1.

Embodiment 64 is the article of embodiment 62 or 63 wherein the average particle size of the surface particles to the particle size of the core is up to 0.2:1, or up to 0.3:1, or up to 0.4:1, or up to 0.5:1.

Embodiment 65 is the article of any of embodiments 34 to 64 wherein the surface particles comprise inorganic particles.

Embodiment 66 is the article of embodiment 65 wherein the inorganic surface particles comprise alumina, silica, zirconia, silicon carbide, diamond, aluminum nitride, silicon nitride, boron nitride, cemented carbide, stainless steel, or mixtures thereof.

Embodiment 67 is the article of any of embodiments 34 to 66 wherein the core and surface particles have a uniform metal coating on exposed surfaces thereof.

Embodiment 68 is the article of any of embodiments 34 to 67 wherein the metal coating disposed on the core particles and surface particles is of a uniform thickness.

Embodiment 69 is the article of embodiment 68 wherein the metal coating has a thickness of up to 10 micrometers, or up to 5 micrometers, or up to 1 micrometer.

Embodiment 70 is the article of any of embodiments 34 to 69 wherein the metal coating comprises a metal selected from silver, gold, platinum, palladium, nickel, copper, aluminum, and a combination thereof.

Embodiment 71 is the article of embodiment 70 wherein the metal coating comprises a metal selected from silver, gold, platinum, palladium, nickel, copper, and a combination thereof.

Embodiment 72 is the article of embodiment 71 wherein the metal coating comprises silver.

Embodiment 73 is a method for forming conductive particles, the method comprising: providing precursor core particles; placing the precursor core particles in a bed comprising precursor surface particles; heating the bed to adhere surface particles to core particles; and applying a metal coating to at least a portion of the core and surface particles to provide conductive particles. A conductive particle comprises: a core particle comprising at least one of a glass, a glass-ceramic, or a metal; and surface particles adhered to the core particle; wherein the core particles are larger than the surface particles; and a metal coating disposed on at least a portion of the core and surface particles.

Embodiment 74 is the method of embodiment 73 wherein the precursor core particles comprise agglomerates comprising fine particles.

Embodiment 75 is the method of embodiment 74 wherein heating comprises heating the bed comprising precursor surface particles and precursor core particles at a temperature and for a time sufficient to at least partially spheroidize the agglomerates and to adhere the surface particles to the core particle.

Embodiment 76 is the method of embodiment 73 wherein the precursor core particles comprise solid core particles.

Embodiment 77 is the method of embodiment 76 wherein heating comprises heating the bed comprising precursor surface particles and precursor core particles at a temperature and for a time sufficient to at least partially soften the precursor core particle and to adhere surface particles to the core particle Embodiment 78 is the method of any of embodiments 73 to 77 wherein heating comprises heating at a temperature of at least 400° C.

Embodiment 79 is tee method of any of embodiments 73 to 78 wherein heating comprises heating for a time of at least 1 minute.

Embodiment 80 is the method of any of embodiments 73 to 79 wherein applying a metal coating to at least a portion of the core and surface particles comprises sputtering the metal coating.

EXAMPLES

Unless otherwise noted, all parts, percentages, ratios, etc. in the examples and the rest of the specification are by weight, and all reagents used in the examples were obtained, or are available, from general chemical suppliers such as, for example, Sigma-Aldrich Company, Saint Louis, Mo., or may be synthesized by conventional methods.

These abbreviations are used in the following examples: phr=parts per hundred rubber; g=grams, min=minutes, h=hour, ° C.=degrees Celsius, MPa=megapascals, and N-m=Newton-meter.

Preparative Example 1 (PE1)

Preparation of Molded Precursor Particles:

Molded precursor particles according to the invention are made by following the general teachings, as exemplified in Example 1 of U.S. Pat. No. 8,701,441 (Kramlich et. al.).

Virgin borosilicate glass precursor in the form of a pack of extruded and chopped glass rods with a diameter of 1-2 millimeters and length varying from 1-4 centimeters (commercially available from Nipro Glass Americas Corporation, Millville, N.J., under trade designation "W33 Tube Draw") is first loaded into a 1-gallon (3.79-liter) porcelain mill jar (commercially available from Paul O. Abbe, Bensenville, Ill.) equipped with 25-millimeter yttria stabilized zirconia spherical milling media (commercially available from Inframat Advanced Materials, Manchester, Conn.). The material is then dry ball milled for 40 hours to generate a powder (greater than 95 wt-% passing through a 75-micrometer mesh screen). The milled glass powder is then added to deionized water to create a slurry that is 47 wt-% solids. The resulting mixture is then milled for 7.5 hours using a high energy attritor mill (commercially available from Union Process, Inc., Akron, Ohio) loaded with 3-millimeter, yttria-stabilized zirconia media (commercially available from Inframat Advanced Materials, Manchester, Conn.) to form a slurry. The milling is continued until the particle size (d90) of the particles in the slurry is less than 1 micrometer. A binder, surfactant, and release agent are added to the milled glass slurry. The molded precursor particles are prepared by hand spreading the resulting slurry using a doctor blade across a tool having $2.4 \times 10^{-7}$ cm$^3$-pyramidal micromolds to fill the molds. The filled molds are set in an oven set at 204.8° F. (96° C.) and let dry for three hours. The molded microparticles are then removed from the mold by exposure to a sonic horn.

The resulting molded particles above are used in this state in the Examples described below.

Example 1 (EX1)

The molded particles, prepared as described above in PE1, were mixed with 3-micrometer platelet calcined alumina (obtained from Fujimi Corporation, Tualatin, Oreg., under trade designation "3 MICRON PWA"). The mixture included 60 grams molded particles to 240 grams white alumina plates with 3 grams of fumed silica (obtained from Cabot Corp., Boston, Mass., under trade designation "CABOT CT1221") added to promote mixing of the powders and particles. This powder/particle mixture was then rolled in a closed, 500-milliliter polypropylene jar (obtained from Thermo Fisher Scientific, Pittsburgh, Pa., under the trade designation "NALGENE") on a jar roller at 60 revolutions per minute (rpm) for 1 hour to insure proper mixing of particles and powder.

The particle-powder mixture then was heat-treated according to the following time-temperature profile: 10° C./minute ramp up to 600° C.; hold for 1 hour; then 10° C./minute ramp up to 750° C.; hold for 1 hour; then 10°

C./minute ramp to 950° C.; hold for 1 hour. Finally, the sample was allowed to cool within the furnace to room temperature.

After cooling, the fired mixture was run through a 63 to 45-micrometer screen to separate the majority of the loose powder ("PWA 3 MICRON") from the sintered particles. To remove the remainder of the powder, the sintered particles were washed with water while on the 45-micrometer screen and then dried in an oven at 100° C.

One preferred method of metallizing particles is the use of physical vapor deposition (PVD) including magnetron sputtering. PVD method of metallizing particles is disclosed in, for example, U.S. Pat. No. 4,612,242 (Vesley et al.) and U.S. Pat. No. 7,727,931 (Brey et al.). For interfacial adhesion improvement between silver and the particle surface a thin tie layer of NiCr (80:20) was coated before silver coating.

The apparatus used in the following example for the preparation of silver film coated electrically conductive adhesive transfer tape (ECATT particles was described in U.S. Pat. Pub. No. 2014/0363554).

Forty (40) cm$^3$ (45.18 grams) of ECATT particles were dried at 150° C. in a convection oven for 6 hours and loaded in the particle agitator inside the vacuum chamber. The vacuum chamber was pumped down to 5×10$^{-06}$ torr. 70 standard cubic centimeters per minute (sccm) of argon gas was admitted and the sputter process was initiated using a NiCr (3-inch round) target. The sputter power was 0.50 kW and the process pressure was 3 millitorr. Particles were tumbled at 4 rpm during the sputter process. After 2 hours, the sputter process was stopped and the silver deposition was carried out by replacing the NiCr target. Silver was sputtered at 0.25 killoWatts (kW) for 12 hours at an argon sputter gas pressure of 10 millitorr. The density of silver-coated particles was 2.91 g/cm$^3$.

Figure 7:
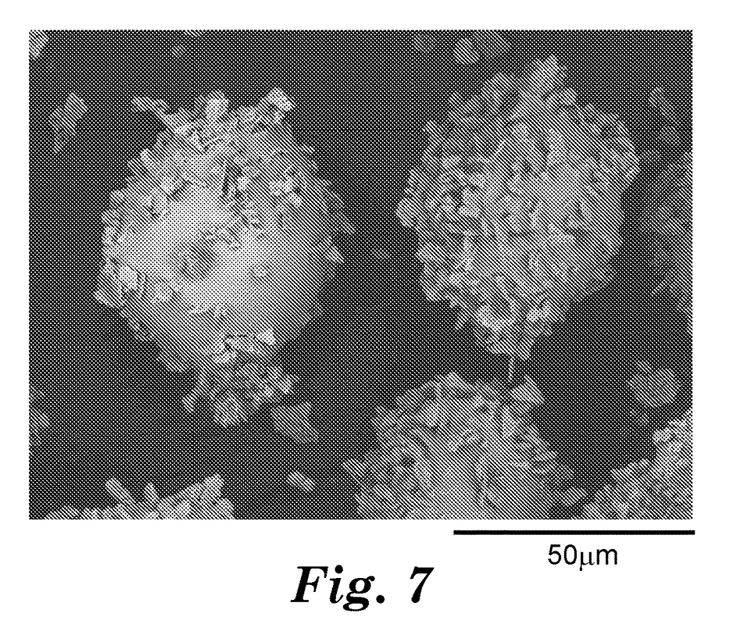
FIG. 7. SEM micrograph of conductive particles of the present disclosure produced by Example 1 (micron bar=50 micrometers).

FIG. 7 is a scanning electron microscope micrograph of the resulting silver-coated, conductive particles of EX1.

The complete disclosures of the patents, patent documents, and publications cited herein are incorporated by reference in their entirety as if each were individually incorporated. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

What is claimed is:

1. Conductive particles, wherein a conductive particle comprises:
   a core particle comprising at least one of a glass, a glass-ceramic, or a metal;
   inorganic surface particles adhered to the core particle, the inorganic surface particles comprising sharp edges, sharp corners, or combinations thereof; and
   a metal coating disposed on at least a portion of the core and surface particles,
   wherein the core particle is larger than the surface particles, and
   wherein the conductive particles comprise core particles having a d$_{10}$ and a d$_{90}$ value each within +/−30% of the average particle size (d$_{50}$).

2. The conductive particles of claim 1, wherein the core particle comprises at least one of a glass or a glass-ceramic.

3. The conductive particles of claim 1, wherein the core particle has an aspect ratio of less than 3:1.

4. The conductive particles of claim 1 dispersed in an organic matrix.

5. The conductive particles of claim 4 dispersed in the organic matrix, wherein the organic matrix comprises a mixture of two or more types of conductive particles that differ in at least one of the core particle, the surface particles, and the metal coating.

6. An article comprising:
   a substrate having two major surfaces;
   a layer comprising an organic matrix disposed on a first major surface of the substrate; and
   conductive particles dispersed within the organic matrix;
   wherein a conductive particle comprises:
      a core particle comprising at least one of a glass, a glass-ceramic, or a metal;
      inorganic surface particles adhered to the core particle, the inorganic surface particles comprising sharp edges, sharp corners, or combinations thereof; and
      a metal coating disposed on at least a portion of the core and surface particles,
   wherein the core particle is larger than the surface particles, and
   wherein the conductive particles comprise core particles having a d$_{10}$ and a d$_{90}$ value each within +/−30% of the average particle size (d$_{50}$).

7. The article of claim 6, wherein the substrate is a conductive substrate comprising a metal selected from silver, gold, platinum, palladium, nickel, copper, aluminum, and a combination thereof.

8. The article of claim 7, wherein the conductive substrate comprises a metal foil, a metal mesh, or a metal-coated substrate.

9. The article of claim 6, wherein the substrate has a thickness of less than 1 millimeter.

10. The article of claim 6, wherein the organic matrix comprises at least 1 volume percent conductive particles, based on the volume of the organic matrix and conductive particles.

11. The article of claim 6, wherein the organic matrix comprises an adhesive.

12. The article of claim 6, wherein the conductive particles dispersed in the organic matrix comprise core particles of uniform particle size.

13. The article of claim 6, wherein the organic matrix comprises a mixture of two or more types of conductive particles that differ in at least one of the core particle, the surface particles, and the metal coating.

14. The article of claim 6, wherein the conductive particles are uniformly distributed throughout the organic matrix.

15. The article claim 6, wherein the conductive particle comprises surface particles fused to the core particle.

16. The article of claim 6, wherein the metal coating is present in an amount of at least 1 weight percent and up to 50 weight percent of the conductive particles.

17. A method for forming conductive particles, the method comprising:
   providing precursor core particles;
   placing the precursor core particles in a bed comprising precursor surface particles;
   heating the bed to adhere surface particles to core particles; and
   applying a metal coating to at least a portion of the core and surface particles to provide conductive particles,
   wherein a conductive particle comprises:
      a core particle comprising at least one of a glass, a glass-ceramic, or a metal;

inorganic surface particles adhered to the core particle, the inorganic surface particles comprising sharp edges, sharp corners, or combinations thereof, wherein the core particles are larger than the surface particles, wherein the metal coating is disposed on at least a portion of the core and surface particles, and wherein the conductive particles comprise core particles having a $d_{10}$ and a $d_{90}$ value each within +/−30% of the average particle size ($d_{50}$).

18. The method of claim 17, wherein the precursor core particles comprise agglomerates comprising fine particles.

19. The method of claim 17, wherein the precursor core particles comprise solid core particles.

* * * * *